United States Patent
Shimizu

(10) Patent No.: US 9,699,385 B2
(45) Date of Patent: Jul. 4, 2017

(54) IMAGING APPARATUS AND STORAGE MEDIUM, AND EXPOSURE AMOUNT CONTROL METHOD

(71) Applicant: KYOCERA Corporation, Kyoto (JP)

(72) Inventor: Takahisa Shimizu, Higashiosaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/830,900

(22) Filed: Aug. 20, 2015

(65) Prior Publication Data

US 2015/0358524 A1   Dec. 10, 2015

Related U.S. Application Data

(63) Continuation of application No. PCT/JP2014/054008, filed on Feb. 20, 2014.

(30) Foreign Application Priority Data

Feb. 21, 2013  (JP) .................................. 2013-032198

(51) Int. Cl.
- *H04N 5/235* (2006.01)
- *G03B 7/091* (2006.01)
- *H04N 5/232* (2006.01)
- *H04N 5/238* (2006.01)

(52) U.S. Cl.
CPC ........... *H04N 5/2353* (2013.01); *G03B 7/091* (2013.01); *H04N 5/238* (2013.01); *H04N 5/2351* (2013.01); *H04N 5/23216* (2013.01); *G06T 2207/20021* (2013.01); *H04N 5/23293* (2013.01)

(58) Field of Classification Search
CPC .. H04N 5/23293; H04N 5/2351; H04N 5/235; H04N 5/23216; H04N 5/2352; H04N 5/2353; H04N 5/238; H04N 5/3535; G03B 7/09979; G06T 2207/20021
See application file for complete search history.

(56) References Cited

U.S. PATENT DOCUMENTS

| | | | | |
|---|---|---|---|---|
| 5,450,163 A | * | 9/1995 | Iwasaki | G03B 7/09979 396/234 |
| 7,271,838 B2 | | 9/2007 | Suekane et al. | |
| 7,649,564 B2 | | 1/2010 | Suekane et al. | |

(Continued)

FOREIGN PATENT DOCUMENTS

| | | |
|---|---|---|
| JP | H05-110912 A | 4/1993 |
| JP | 11-239291 A | 8/1999 |

(Continued)

OTHER PUBLICATIONS

International Search Report dated May 13, 2014, issued for International Application No. PCT/JP2014/054008.

(Continued)

*Primary Examiner* — Michael Osinski
(74) *Attorney, Agent, or Firm* — Procopio Cory Hargreaves and Savitch LLP

(57) ABSTRACT

An imaging apparatus includes an imaging module configured to capture an image, and a controller. The controller obtains a luminance of a minimum luminance area or a maximum luminance area in an imaging target area of an image captured by the imaging module and controls an exposure amount in the imaging module on the basis of the luminance.

8 Claims, 7 Drawing Sheets

(56) References Cited

U.S. PATENT DOCUMENTS

| | | | | |
|---|---|---|---|---|
| 8,290,263 B2* | 10/2012 | Tsuruoka | ............... | H04N 1/407 348/222.1 |
| 8,934,050 B2* | 1/2015 | Imai | ................... | H04N 5/23216 348/333.02 |
| 2002/0171747 A1* | 11/2002 | Niikawa | ............ | H04N 5/23293 348/333.01 |
| 2003/0210345 A1* | 11/2003 | Nakamura | ........... | H04N 5/2355 348/362 |
| 2004/0042791 A1* | 3/2004 | Suekane | ........... | H04N 5/23293 396/661 |
| 2004/0125220 A1* | 7/2004 | Fukuda | ............. | H04N 5/23293 348/234 |
| 2004/0169741 A1 | 9/2004 | Hayashi | | |
| 2004/0179131 A1* | 9/2004 | Honda | ................... | H04N 5/235 348/362 |
| 2005/0270397 A1* | 12/2005 | Battles | ................ | H04N 5/2351 348/333.01 |
| 2007/0201858 A1* | 8/2007 | Shiohara | ............ | H04N 1/00039 396/310 |
| 2007/0263097 A1* | 11/2007 | Zhao | .................... | H04N 5/2351 348/221.1 |
| 2008/0111913 A1* | 5/2008 | Okamoto | ............. | H04N 5/2354 348/363 |
| 2009/0244329 A1* | 10/2009 | Kuniba | ................... | G06T 5/009 348/241 |
| 2010/0045824 A1* | 2/2010 | Kido | .................. | H04N 5/23293 348/234 |
| 2011/0292242 A1* | 12/2011 | Imai | .................... | H04N 5/23216 348/229.1 |
| 2012/0133793 A1* | 5/2012 | Inaba | .................. | H04N 5/2351 348/229.1 |
| 2012/0314124 A1* | 12/2012 | Kaizu | .................. | H04N 5/2353 348/362 |
| 2014/0176789 A1* | 6/2014 | Kubota | .............. | H04N 5/23219 348/362 |

FOREIGN PATENT DOCUMENTS

| | | |
|---|---|---|
| JP | 2003-333378 A | 11/2003 |
| JP | 2004-248136 A | 9/2004 |
| JP | 2008-236534 A | 10/2008 |
| JP | 2010-273007 A | 12/2010 |

OTHER PUBLICATIONS

Written Opinion of the International Searching Authority issued by Japan Patent Office for International Application No. PCT/JP2014/054008.

Office Action dated Feb. 28, 2017 issued by the Japan Patent Office in counterpart Japanese Application No. 2013-032198 with concise explanation, 7 pages.

* cited by examiner

US 9,699,385 B2

IMAGING APPARATUS AND STORAGE MEDIUM, AND EXPOSURE AMOUNT CONTROL METHOD

CROSS-REFERENCE TO RELATED APPLICATION

The present application is a continuation based on PCT Application No. PCT/JP2014/054008 filed on Feb. 20, 2014, which claims the benefit of Japanese Application No. 2013-032198 filed on Feb. 21, 2013. PCT Application No. PCT/JP2014/054008 is entitled "IMAGING DEVICE, CONTROL PROGRAM AND EXPOSURE CONTROL METHOD", and Japanese Application No. 2013-032198 is entitled "IMAGING DEVICE, CONTROL PROGRAM AND EXPOSURE AMOUNT CONTROL METHOD". The contents of which are incorporated by reference herein in their entirety.

FIELD

Embodiments of the present disclosure relate to an imaging apparatus capturing an image.

BACKGROUND

Various techniques have traditionally been proposed in relation to imaging apparatuses.

SUMMARY

An imaging apparatus, storage medium, and exposure amount control method are disclosed. In one embodiment, an imaging apparatus comprises an imaging module configured to capture an image, and a controller configured to obtain a first luminance of a minimum luminance area or a maximum luminance area in an imaging target area of an image captured by the imaging module, and controls an exposure amount in the imaging module on the basis of the first luminance.

In one embodiment, a non-transitory storage medium readable by a computer stores a control program for controlling an operation of an imaging apparatus configured to capture an image. The storage medium storing the control program is configured to cause the imaging apparatus to execute the steps of (a) obtaining a luminance of a minimum luminance area or a maximum luminance area in an imaging target area of a captured image, and (b) controlling an exposure amount in the imaging apparatus on the basis of the luminance.

In one embodiment, an exposure amount control method in an imaging apparatus configured to capture an image comprises the steps of (a) obtaining a luminance of a minimum luminance area or a maximum luminance area in an imaging target area of a captured image; and (b) controlling an exposure amount in the imaging apparatus on the basis of the luminance.

DETAILED DESCRIPTION

Figure 1:
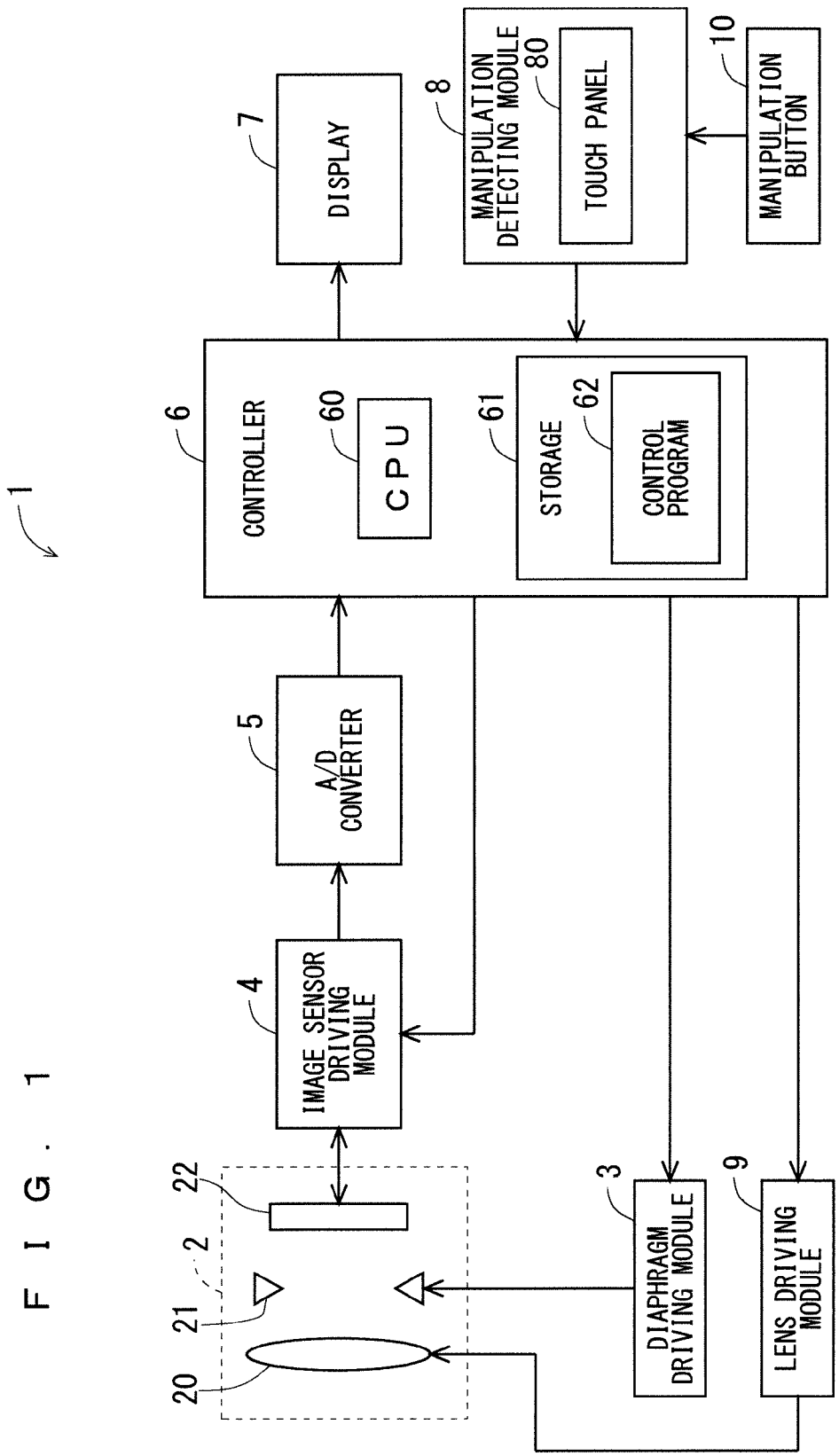
FIG. 1 illustrates a configuration of an imaging apparatus.

FIG. 1 illustrates the configuration of an imaging apparatus 1. The imaging apparatus 1 can capture a still image and video. The imaging apparatus 1 is used in, for example, a mobile phone, a digital still camera, a digital video camera, and a personal computer.

As illustrated in FIG. 1, the imaging apparatus 1 includes an imaging module 2, a diaphragm driving module 3, an image sensor driving module 4, an A/D converter 5, a controller 6, a display 7, a manipulation detecting module 8, a lens driving module 9, and a plurality of manipulation buttons 10. FIG. 1 illustrates one manipulation button 10 for clarity's sake.

The imaging module 2 includes a lens 20, a diaphragm 21, and an image sensor 22. The imaging module 2 can capture, for example, a color image. Hereinbelow, a "captured image" refers to an image captured by the imaging module 2.

When the lens 20 is driven by the driving module 9, its position moves in the optical axis direction. Change in the position of the lens 20 changes a focus in the imaging module 2.

When the diaphragm 21 is driven by the diaphragm driving module 3, the size of the aperture of the diaphragm 21 changes. In response to a change in the size of the aperture of the diaphragm 21, an amount of the light entering the image sensor 22 through the lens 20 changes. This accordingly changes an exposure amount (a light exposure amount) in the imaging module 2.

The image sensor 22 is, for example, a CCD (Charge Coupled Device) or a CMOS (Complementary Metal Oxide Semiconductor) sensor. The image sensor 22 can be driven by the image sensor driving module 4 to capture an image of an imaging target area (range of viewing angle) through the lens 20.

The image sensor driving module 4 can read, from the image sensor 22, a signal generated in the image sensor 22 upon irradiation of the image sensor 22 with light through the lens 20 to acquire an analog image signal indicative of an image captured in the image sensor 22. Then, the image sensor driving module 4 can output the acquired image signal. When the image sensor driving module 4 changes an exposure time (a light exposure time) of the image sensor 22, the exposure amount in the imaging module 2 accordingly changes.

As described above, the exposure amount in the imaging module 2 is controlled through adjustment of at least one of the size of the aperture of the diaphragm 21 and the exposure time of the image sensor 22.

The A/D converter 5 can convert an analog image signal output from the image sensor driving module 4 into a digital image signal and then output the digital image signal to the controller 6.

Figure 2:
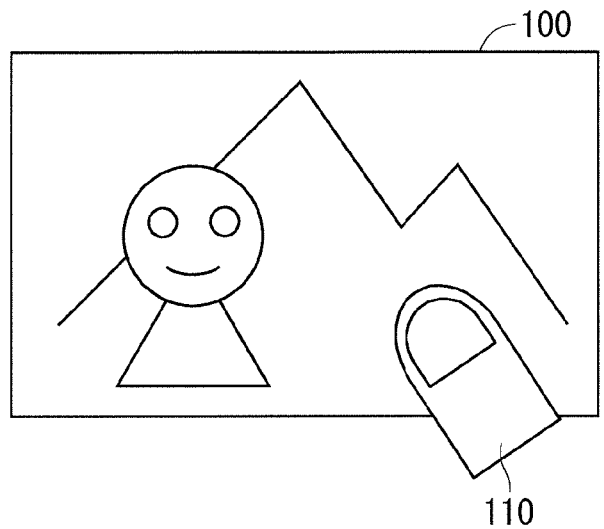
FIG. 2 illustrates a display example of a display area.

The display 7 includes, for example, a liquid crystal display panel or an organic electroluminescent (EL) panel and has a display area (display screen) 100 showing various information such as characters, symbols, and diagrams. The display 7 can be controlled by the controller 6 to display various information in the display area 100. FIG. 2 illustrates a display example of the display area 100. The display area 100, which is provided on the surface of the case that accommodates the imaging apparatus 1, can be visually recognized by a user. For the imaging apparatus 1 to be used in, for example, a mobile phone, the display area 100 is provided on the front surface of the case of the mobile phone. In the example of FIG. 2, an image of an imaging target area (range of viewing angle) appears in the display area 100.

The manipulation detecting module 8 can detect a user manipulation for the display area 100 and a user manipulation for the manipulation buttons 10. The manipulation detecting module 8 includes a touch panel 80. The touch panel 80 is, for example, a projected capacitive touch panel. The touch panel 80 can be controlled by the controller 6 to detect a manipulation for the display area 100 performed by a finger 110 or the like (see FIG. 2). When the user manipulates the display area 100 with the finger 110 or the like, the touch panel 80 can input a signal corresponding to the manipulation to the controller 6. The controller 6 can identify the contents of the manipulation performed for the display area 100 on the basis of the signal from the touch panel 80, thereby performing the processing corresponding to the contents.

Each of the plurality of manipulation buttons 10 is depressed by the user. The plurality of manipulation buttons 10 include a power button for turning on/off the power of the imaging apparatus 1 and a release button (release switch). When the manipulation button 10 is depressed by the user, the manipulation detecting module 8 can output a signal to the controller 6 in response to the depressing. When receiving an input of a signal from the manipulation detecting module 8 after the depressing of the manipulation button 10, the controller 6 can perform the processing assigned to the manipulation button 10.

The controller 6, which includes a CPU (Central Processing Unit) 60 and a storage 61, can control other components of the imaging apparatus 1 to manage the operation of the imaging apparatus 1 in a supervising manner. The storage 61 is formed of a non-transitory recording medium that can be read by the controller 6 (CPU 101), such as a ROM (Read Only Memory) or a RAM (Random Access Memory). The storage 61 stores a control program 62 for controlling the operation of the imaging apparatus 1 and the like. The CPU 60 executes the control program 62 in the storage 61, so that the functions of the controller 6 are executed. Various functional blocks are created in the controller 6 by the CPU 60 executing the control program 62.

The storage 61 may include a non-transitory, computer-readable recording medium other than the ROM and the RAM. The storage 61 may include, for example, a small hard disk drive and an SSD (Solid State Drive).

The controller 6 can perform various processings such as compression on a to-be-input signal and then store the image signal in the storage 61. The controller 6 can read the image signal stored in the storage 61 from the storage 61 and then output the image signal to the display 7. The display 7 can display an image, indicated by an image signal input from the controller 6, in the display area 100.

The controller 6 has an AF (Auto Focus) function of adjusting the position of the lens 20 via the lens driving module 9 to automatically control the focus in the imaging module 2. The controller 6 can control the lens driving module 9 on the basis of an input image signal to adjust the position of the lens 20.

Figure 3:
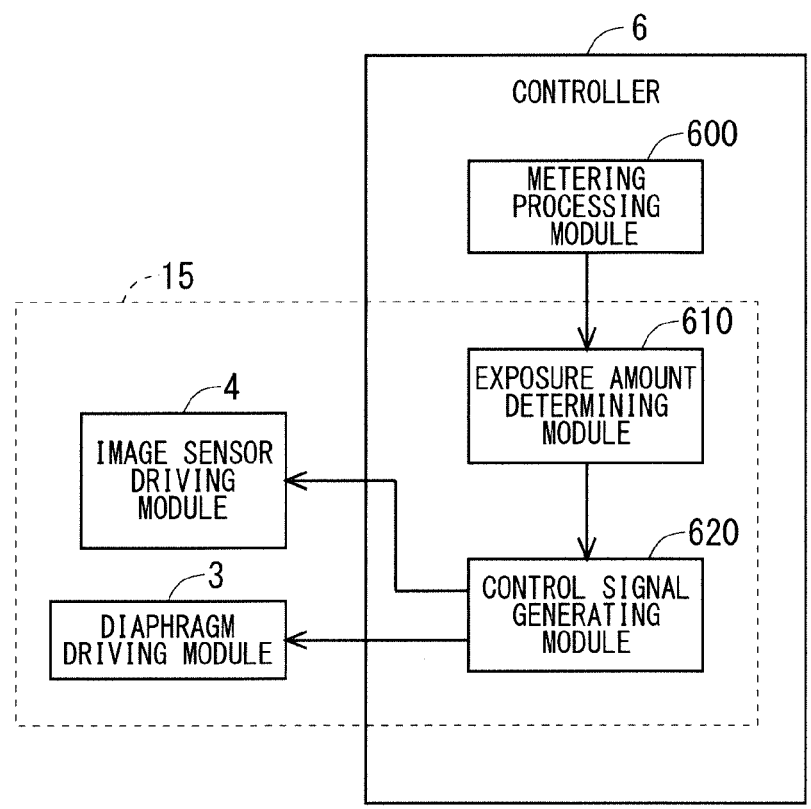
FIG. 3 illustrates functional blocks of a controller.

The controller 6 has an AE (Auto Exposure) function of controlling the diaphragm driving module 3 and the image sensor driving module 4 to automatically control an exposure amount in the imaging module 2. FIG. 3 illustrates the functional blocks regarding the AE function in the controller 6.

As illustrated in FIG. 3, the controller 6 includes a metering processing module 600, an exposure amount determining module 610, and a control signal generating module 620 as the functional blocks. The metering processing module 600, the exposure amount determining module 610, and the control signal generating module 620 may be formed not as the functional block but as hardware circuitry.

The metering processing module 600 can perform a metering processing of obtaining the brightness of a subject. In other words, the metering processing module 600 can obtain the luminance of an imaging target area on the basis of an image signal output from the A/D converter 5. The metering processing module 600 functions as a luminance acquiring module that obtains the luminance of an imaging target area.

The exposure amount determining module 610 can determine an exposure amount in the imaging module 2 on the basis of the luminance obtained in the metering processing module 600. The control signal generating module 620 can generate, on the basis of the exposure amount determined in the exposure amount determining module 610, an exposure time control signal for controlling an exposure time of the image sensor 22 and a diaphragm control signal for controlling the size of the aperture of the diaphragm 21. Then, the control signal generating module 620 can output the generated exposure time control signal and diaphragm control signal to the image sensor driving module 4 and the diaphragm driving module 3, respectively.

The image sensor driving module 4 can control an exposure time of the image sensor 22 on the basis of the input exposure time control signal. The diaphragm driving module 3 can control the size of the aperture of the diaphragm 21 on the basis of the input diaphragm control signal. The exposure amount in the imaging module 2 is accordingly set as the exposure amount determined in the exposure amount determining module 610.

The exposure amount determining module 610, the control signal generating module 620, the image sensor driving module 4, and the diaphragm driving module 3 constitute an exposure amount controller 15 that controls an exposure amount in the imaging module 2. The exposure amount controller 15 can control an exposure amount in the imaging module 2 on the basis of the luminance of the imaging target area obtained in the metering processing module 600.

<Details of AE Function>

The imaging apparatus 1 has a plurality of exposure amount control modes. More specifically, the imaging apparatus 1 has first to fifth exposure amount control modes.

The first exposure amount control mode is a mode of controlling an exposure amount on the basis of the luminance of an imaging target area (brightness of a subject (field)) obtained using multi-zone metering (also referred to as evaluation metering or multi-pattern metering). In multi-zone metering, an imaging target area is divided into a plurality of blocks, and the luminance in each block is obtained. The exposure amount is determined on the basis of the luminances of the plurality of blocks.

The second exposure amount control mode is a mode of controlling an exposure amount on the basis of the luminance of the imaging target area obtained using center-weighted metering (also referred to as center-weighted average metering). In center-weighted metering, the luminances of the central portion of the imaging target area and its peripheral portions are obtained. An exposure amount is determined with importance given to the luminance of the central portion of the imaging target area among the obtained luminances.

The third exposure amount control mode is a mode of controlling an exposure amount on the basis of the luminance of the imaging target area obtained using spot metering (also referred to as partial metering). In spot metering, only the luminance in the central portion of the imaging target area is obtained. An exposure amount is determined on the basis of only the luminance of the central portion of the imaging target area.

The fourth exposure amount control mode is a mode of controlling an exposure amount on the basis of the luminance in a minimum luminance area of the imaging target area.

The fifth exposure amount control mode is a mode of controlling an exposure amount on the basis of the luminance in a maximum luminance area of the imaging target area.

The user can designate a to-be-used mode from among the first to fifth exposure amount control modes by manipulating the imaging apparatus 1, for example, by manipulating the display area 100. When the touch panel 80 detects a user manipulation of designating a use mode from among the first to fifth exposure amount control modes for the display area 100, the controller 6 can control an exposure amount by using the exposure amount control mode designated by the user manipulation. The user may designate a use mode from among the first to fifth exposure amount control modes by the user manipulation for the manipulation button 10.

Figure 4:
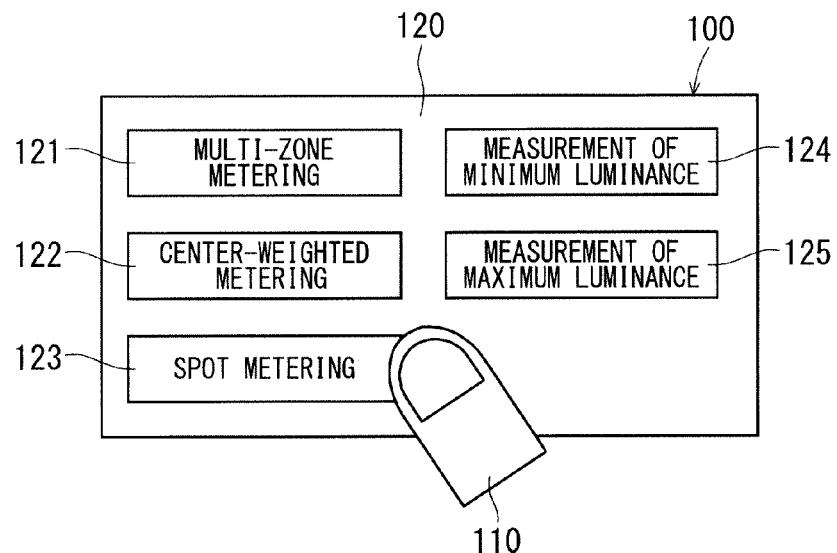
FIG. 4 illustrates an example of an exposure amount control mode selection screen.

The user can designate a use mode from among the first to fifth exposure amount control modes, using an exposure amount control mode selection screen 120 that appears in the display area 100. FIG. 4 illustrates an example of the exposure amount control mode selection screen 120.

As illustrated in FIG. 4, the exposure amount control mode selection screen 120 shows a first selection button 121 indicating a text "multi-zone metering," a second selection button 122 indicating a text "center-weighted metering," a third selection button 123 indicating a text "spot metering," a fourth selection button 124 indicating a text "measurement of minimum luminance," and a fifth selection button 125 indicating a text "measurement of maximum luminance."

When the first selection button 121, the second selection button 122, the third selection button 123, the fourth selection button 124, and the fifth selection button 125 are manipulated (for example, tapped) with the finger 110 of the user or the like, the controller 6 individually uses the first to fifth exposure amount control modes. The user manipulation for the first selection button 121 is a manipulation of designating the first exposure amount control mode as a use mode, and the user manipulation for the second selection button 122 is a manipulation of designating the second exposure amount control mode as a use mode. The user manipulation for the third selection button 123 is a manipulation of designating the third exposure amount control mode as a use mode, and the user manipulation for the fourth selection button 124 is a manipulation of designating the fourth exposure amount control mode as a use mode. The user manipulation for the fifth selection button 125 is a manipulation of designating the fifth exposure amount control mode as a use mode.

When the controller 6 uses the first exposure amount control mode, the metering processing module 600 can obtain the luminance of an imaging target area using multi-zone metering. Specifically, the metering processing module 600 divides an imaging target area into a plurality of blocks and then obtains the luminances (brightnesses) in the plurality of blocks on the basis of an image signal output from the A/D converter 5. The exposure amount determining module 610 can determine an exposure amount on the basis of the luminances in the plurality of blocks obtained in the metering processing module 600 such that the imaging target area is imaged at an appropriate luminance (brightness) as a whole. The imaging module 2 can capture an image in the exposure amount determined in the exposure amount determining module 610.

When the controller 6 uses the second exposure amount control mode, the metering processing module 600 can obtain the luminance of an imaging target area using center-weighted metering. Specifically, the metering processing module 600 obtains the luminances of the central portion and its peripheral portions in the imaging target area on the basis of an image signal output from the A/D converter 5. The exposure amount determining module 610 can determine an exposure amount on the basis of the luminances obtained in the metering processing module 600 such that the central portion is mainly imaged at an appropriate luminance in the imaging target area. The imaging module 2 can capture an image in the exposure amount determined in the exposure amount determining module 610.

When the controller 6 uses the third exposure amount control mode, the metering processing module 600 can obtain the luminance of an imaging target area using spot metering. Specifically, the metering processing module 600 obtains only the luminance of the central portion of the imaging target area on the basis of an image signal output from the A/D converter 5. In the imaging target area, the range of the central portion for which its luminance is obtained using spot metering is narrower than the range of the central portion for which its luminance is obtained using center-weighted metering. The exposure amount determining module 610 can determine an exposure amount on the basis of the luminance obtained in the metering processing module 600 such that an image in the central portion of the imaging target area is captured at an appropriate luminance. The imaging module 2 can capture an image in the exposure amount determined in the exposure amount determining module 610.

When the controller 6 uses the fourth exposure amount control mode, the metering processing module 600 can obtain the luminance of the minimum luminance area in an imaging target area on the basis of an image signal output from the A/D converter 5. The exposure amount determining module 610 can determine an exposure amount on the basis of the luminance obtained in the metering processing module 600 such that the minimum luminance area in the imaging target area is imaged at an appropriate luminance (brightness). The imaging module 2 can capture an image in the exposure amount determined in the exposure amount determining module 610. This enables imaging of an extremely dark portion in the imaging target area at an appropriate brightness.

When the controller 6 uses the fifth exposure amount control mode, the metering processing module 600 can obtain the luminance of the maximum luminance area in the imaging target area on the basis of an image signal output from the A/D converter 5. The exposure amount determining module 610 can determine an exposure amount on the basis of the luminance obtained in the metering processing module 600 such that the maximum luminance area in the imaging target area is imaged at an appropriate luminance (brightness). The imaging module 2 can capture an image in the exposure amount determined in the exposure amount determining module 610. This enables imaging of an extremely bright portion in the imaging target area.

<Method of Obtaining Luminances of Minimum Luminance Area and Maximum Luminance Area>

Figure 5:
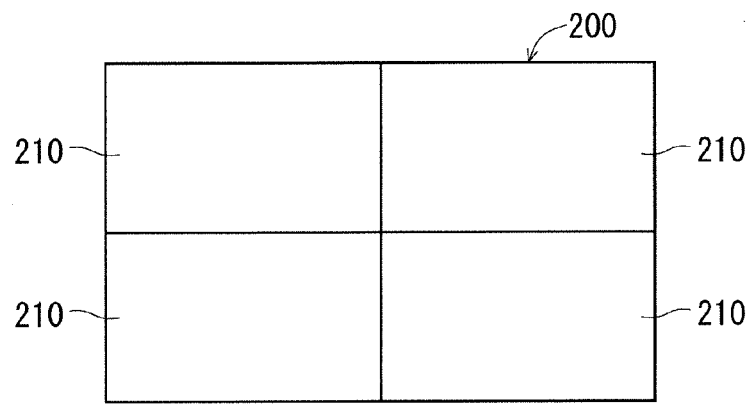
FIG. 5 illustrates an example of how to divide an imaging target area.

The following describes in detail the operation of the metering processing module 600 in the fourth and fifth exposure amount control modes. In the fourth and fifth exposure amount control modes, the metering processing module 600 divides an imaging target area into a plurality of blocks and then obtains the luminance of each of the plurality of blocks. FIG. 5 illustrates an example of how to divide an imaging target area (range of viewing angle) 200. In the example of FIG. 5, the imaging target area 200 is divided into four blocks 210 in matrix.

When obtaining the luminance of each of a plurality of blocks 210 of the imaging target area 200, the metering processing module 600 divides a captured image being an image of the imaging target area 200 into a plurality of areas, similarly to the imaging target area 200. The metering processing module 600 then obtains the luminance of each of the plurality of areas of the captured image on the basis of an image signal, output from the A/D converter 5, indicative of the captured image. When the metering processing module 600 obtains the luminance of an area of a captured image, the metering processing module 600 calculates, as the luminance of this area, an average value of the luminances of a plurality of pixels constituting the area.

Then, the metering processing module 600 sets the luminance of each area of the captured image as the luminance of the block 210 at the same position of this area in the imaging target area 200, to thereby obtain the luminance of each of the plurality of blocks 210 of the imaging target area 200.

In the fourth exposure amount control mode, the metering processing module 600 obtains the luminances of a plurality of blocks 210, and then, identifies a minimum luminance block having the smallest luminance among the plurality of blocks 210. The metering processing module 600 then sets the luminance of the identified minimum luminance block as the luminance of a minimum luminance area in the imaging target area. The exposure amount determining module 610 determines an exposure amount on the basis of the luminance of the minimum luminance block identified in the metering processing module 600. This enables control of an exposure amount such that an image of the minimum luminance block, included in a captured image, has an appropriate luminance. For example, when the minimum luminance block is a lower right block 210 in FIG. 5, an exposure amount is controlled such that an image of the lower right block 210 included in the captured image has an appropriate luminance.

In the fifth exposure amount control mode, meanwhile, the metering processing module 600 obtains the luminances of a plurality of blocks 210, and then, identifies a maximum luminance block having the largest luminance among the plurality of blocks 210. The metering processing module 600 then sets the luminance of the identified maximum luminance block as the luminance of a maximum luminance area in the imaging target area. The exposure amount determining module 610 determines an exposure amount on the basis of the luminance of the maximum luminance block identified in the metering processing module 600. This enables control of an exposure amount such that the image of the maximum luminance block included in the captured image has an appropriate luminance. For example, when the maximum luminance block is an upper left block 210 in FIG. 5, an exposure amount is controlled such that the image of the upper left block 210 included in the captured image has an appropriate luminance.

Figure 6:
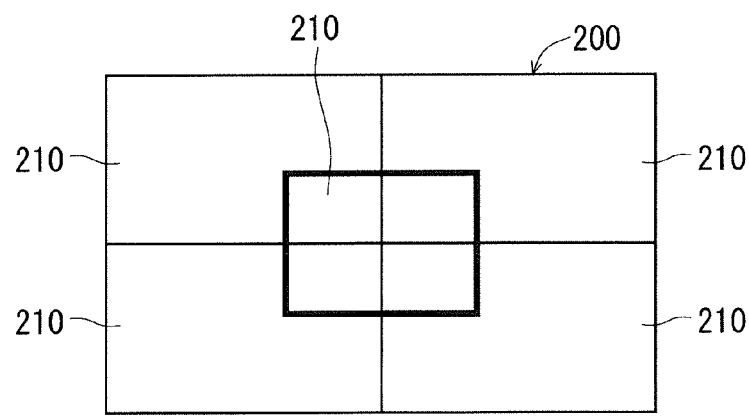
FIG. 6 illustrates another example of how to divide the imaging target area.
Figure 7:
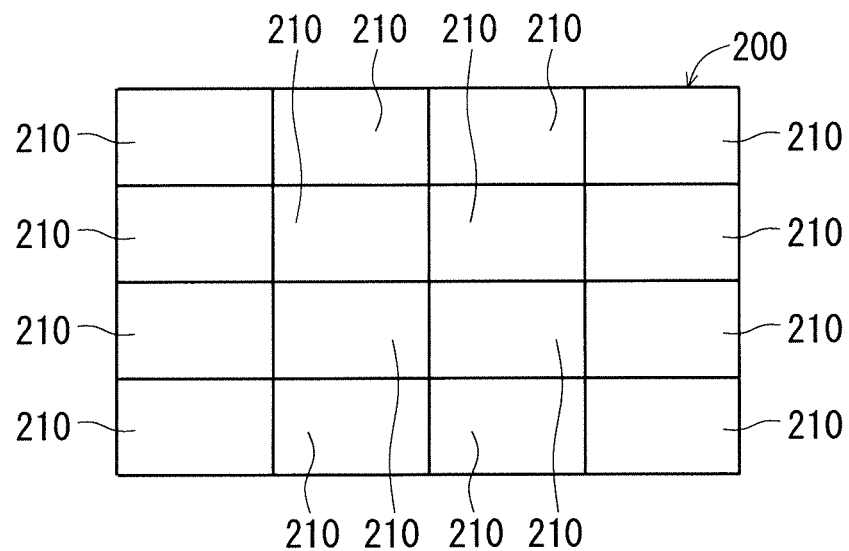
FIG. 7 illustrates still another example of how to divide the imaging target area.

The method of dividing an imaging target area may be a method other than the method illustrated in FIG. 5. FIGS. 6 and 7 each illustrate another example of how to divide the imaging target area 200.

In the example of division of FIG. 6, the imaging target area 200 is divided into five blocks 210. A block 210 of the central portion surrounded by a bold line overlaps the other four blocks 210, namely, upper left, lower left, upper right, and lower right blocks 210 as in FIG. 5. In such a case, in the controller 6 operating in the fourth exposure amount control mode, when the metering processing module 600 identifies the block 210 of the central portion as a minimum luminance block and sets the luminance of the minimum luminance block as the luminance of a minimum luminance area, the exposure amount determining module 610 determines an exposure amount on the basis of the luminance of the block 210 of the central portion.

In the example of division of FIG. 7, the imaging target area 200 is divided into 16 blocks 210 in matrix. In such a case, in the controller 6 operating in the fifth exposure amount control mode, when the metering processing module 600 identifies, for example, the second left, second top block 210 as a maximum luminance block, the exposure amount determining module 610 determines an exposure amount on the basis of the luminance of this block 210.

The method of dividing an imaging target area may be designated by the user manipulating the imaging apparatus 1, for example, the display area 100. In one example, the user may designate a to-be-used division method from among the three division methods illustrated in FIGS. 5 to 7, using a division method selection screen 130 that appears in the display area 100.

Figure 8:
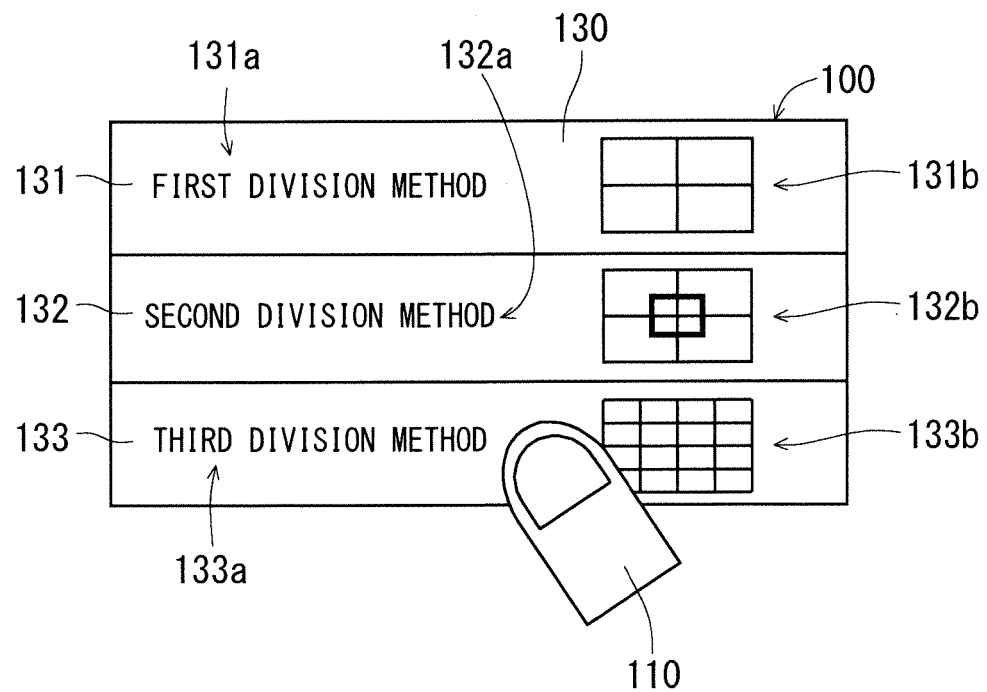
FIG. 8 illustrates an example of a division method selection screen.

FIG. 8 illustrates an example of the division method selection screen 130. The example of FIG. 8 illustrates the division method illustrated in FIG. 5 as a first division method, the division method illustrated in FIG. 6 as a second division method, and the division method illustrated in FIG. 7 as a third division method.

As illustrated in FIG. 8, the division method selection screen 130 that appears in the display area 100 shows a first selection button 131, a second selection button 132, and a third selection button 133 corresponding to the first to third division methods, respectively.

The first selection button 131 shows a text 131a "first division method" and a division diagram 131b indicative of how an imaging target area is divided in the first division method. The second selection button 132 shows a text 132a "second division method" and a division diagram 132b indicative of how an imaging target area is divided in the second division method. The third selection button 133 shows a text 133*a* "third division method" and a division diagram 133*b* indicative of how an imaging target area is divided.

When the touch panel 80 detects that the first selection button 131 has been manipulated (for example, tapped) with the finger 110 of the user or the like, the metering processing module 600 uses the first division method illustrated in FIG. 5. When the touch panel 80 detects that the second selection button 132 has been manipulated with the finger 110 of the user or the like, the metering processing module 600 uses the second division method illustrated in FIG. 6. When the touch panel 80 detects that the third selection button 133 has been manipulated with the finger 110 of the user or the like, the metering processing module 600 uses the third division method illustrated in FIG. 7.

As described above, the metering processing module 600 may divide an imaging target area into a plurality of blocks not by a fixed division method but by the division method designated through the user manipulation detected by the manipulation detecting module 8.

The division method selection screen 130 as illustrated in FIG. 8 appears in the display area 100, for example, after the fourth selection button 124 or the fifth selection button 125 is manipulated while the exposure amount control mode selection screen 120 illustrated in FIG. 4 appears in the display area 100. The user can manipulate the first selection button 131, the second selection button 132, and the third selection button 133, which appear in the division method selection screen 130 that appears after the fourth selection button 124 is manipulated, to designate the method of dividing an imaging target area to be used by the metering processing module 600 in the fourth exposure amount control mode. In addition, the user can manipulate the first selection button 131, the second selection button 132, and the third selection button 133, which appear in the division method selection screen 130 after the fifth selection button 125 is manipulated, to designate the method of dividing an imaging target area to be used by the metering processing module 600 in the fifth exposure amount control mode.

Even in the same imaging environment, the state of luminance (brightness) in a captured image varies when the method of dividing an imaging target area by the metering processing module 600 is changed. A captured image according to the user's preference can accordingly be obtained by allowing the user to designate a to-be-used division method from among a plurality of division methods as described above.

Although an imaging target area is divided into a plurality of blocks to obtain the luminances of a minimum luminance area and a maximum luminance area in the imaging target area, other method may be used to obtain the luminances of a minimum luminance area and a maximum luminance area in an imaging target area.

<Imaging Operation of Imaging Apparatus>

Figure 9:
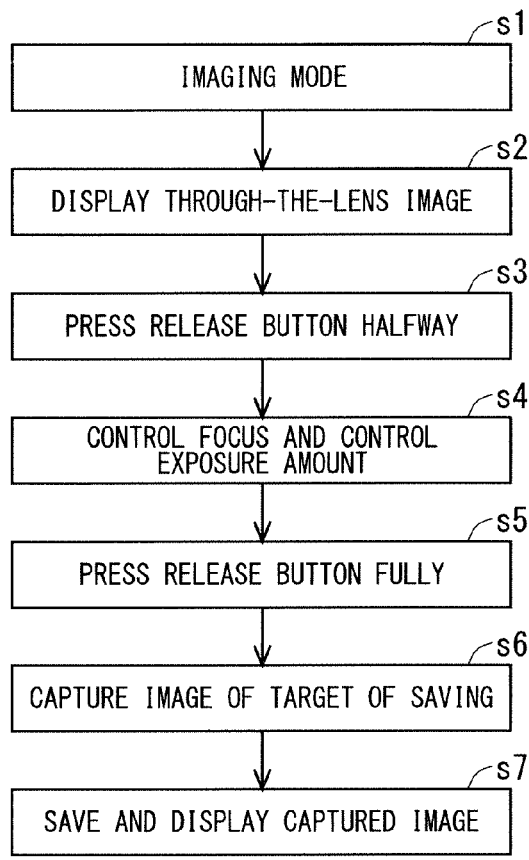
FIG. 9 illustrates a flowchart showing an operation of the imaging apparatus.

The following describes a series of operations of the imaging apparatus 1 when the imaging apparatus 1 captures an image. FIG. 9 illustrates a flowchart showing a series of operations of the imaging apparatus 1 when the imaging apparatus 1 captures, for example, a still image.

As illustrated in FIG. 9, in Step s1, the controller 6 sets the operation mode of the imaging apparatus 1 to an imaging mode. Then, the imaging module 2 starts imaging an imaging target area, so that an image signal indicative of an image of the imaging target area is input to the controller 6. When the manipulation detecting module 8 detects a predetermined manipulation for the display area 100 or detects a manipulation for a predetermined manipulation button 10, the controller 6 sets the operation mode of the imaging apparatus 1 to the imaging mode.

Upon receipt of the image signal, in Step s2, the controller 6 controls the display 7 on the basis of the input image signal to cause the display 7 to display a through-the-lens image indicative of an image of the imaging target area. As a result, the through-the-lens image appears in the display area 100, and the user can check the state of the imaging target area by viewing the display area 100.

After that, in Step s3, the manipulation detecting module 8 detects that a release button included in a plurality of manipulation buttons 10 has been manipulated (pressed halfway). Then, the controller 6 adjusts the position of the lens 20 through the lens driving module 9, thereby controlling the focus in the imaging module 2. Further, the controller 6 uses the exposure amount control mode already designated by the user to control an exposure amount in the imaging module 2. In this case where the exposure amount control mode designated by the user is the fourth exposure amount control mode or the fifth exposure amount control mode, the metering processing module 600 uses the division method designated by the user to divide the imaging target area into a plurality of blocks, thereby obtaining the luminance of a minimum luminance area or a maximum luminance area of the imaging target area.

After Step s4, in Step s5, the manipulation detecting module 8 detects that the release button has been manipulated (pressed fully). Then, the imaging module 2 captures an image of a target of saving (target of recording), and an image signal indicative of this image is input to the controller 6. Upon receipt of the image signal indicative of the target of saving, in Step s7, the controller 6 performs compression processing or the like on the image signal and then records and saves the image signal in the storage 61. The controller 6 also causes the display 7 to display an image indicative of the image signal. Consequently, a still image indicative of the state of the imaging target area appears in the display area 100.

When the release button is pressed fully without being pressed halfway, Step s4 may be executed, and subsequently, Steps s6 and s7 may be executed. In the continuous execution of Steps s4, s6, and s7, the release button may be a manipulation button that appears in the display area 100. In this case, when the manipulation button is, for example, tapped, Steps s4, s6, and s7 are executed continuously.

The imaging apparatus 1 may not have at least one of the first to third exposure amount control modes. Alternatively, the imaging apparatus 1 may not have one of the fourth and fifth exposure amount control modes.

As described above, the metering processing module 600 functioning as a luminance acquiring module obtains the luminance of a minimum luminance area or a maximum luminance area in an imaging target area. The exposure amount controller 15 controls an exposure amount in the imaging module 2 on the basis of the luminance of the minimum luminance area or the maximum luminance area in the imaging target area, which has been obtained in the metering processing module 600. The imaging apparatus 1 therefore automatically images a dark portion or a bright portion in the imaging target area at an appropriate brightness.

When an imaging target area is divided into a plurality of blocks to obtain the luminances of a minimum luminance area and a maximum luminance area, as described with reference to FIG. 8, the imaging apparatus 1 can obtain a captured image according to the user's preference by allowing the user to designate the method of dividing an imaging target area.

<Modification: Sixth Exposure Amount Control Mode>

The imaging apparatus 1 may be provided with a sixth exposure amount control mode that allows the user to designate an area of an imaging target area, where an image is captured at an appropriate brightness. The following describes an imaging apparatus 1 according to one modification that has the sixth exposure amount control mode.

Figure 10:
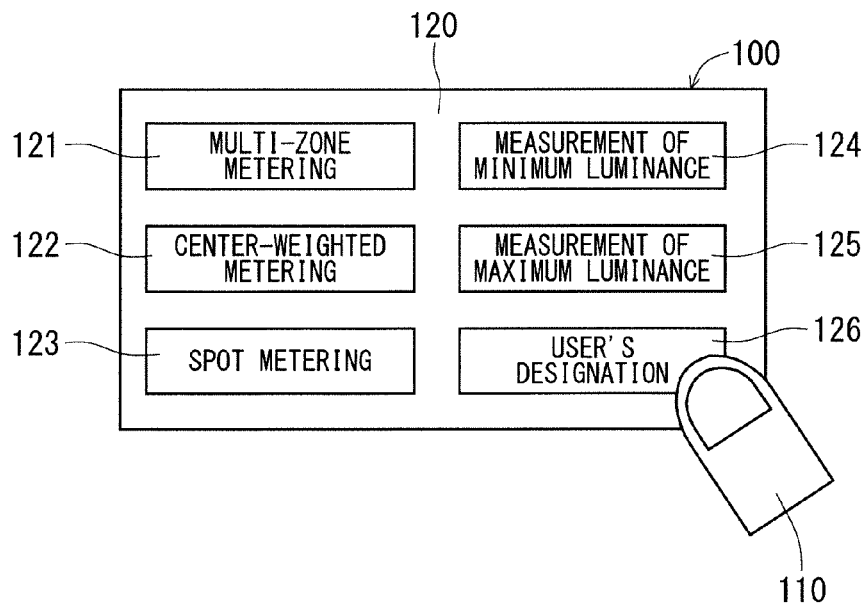
FIG. 10 illustrates a modification of the exposure amount control mode selection screen.

FIG. 10 illustrates an example of an exposure amount control mode selection screen 120 that appears in the imaging apparatus 1. As illustrated in FIG. 10, the exposure amount control mode selection screen 120 that appears in the display area 100 shows a sixth selection button 126 indicating a text "user's designation" in addition to the first selection button 121, the second selection button 122, the third selection button 123, the fourth selection button 124, and the fifth selection button 125. When the sixth selection button 126 is manipulated (for example, tapped) with the finger 110 of the user or the like, the controller 6 uses the sixth exposure amount control mode. When the controller 6 uses the sixth exposure amount control mode, the user can designate a portion of an imaging target area, which is imaged at an appropriate brightness, with reference to the luminance distribution of the imaging target area appearing in the display area 100.

Figure 11:
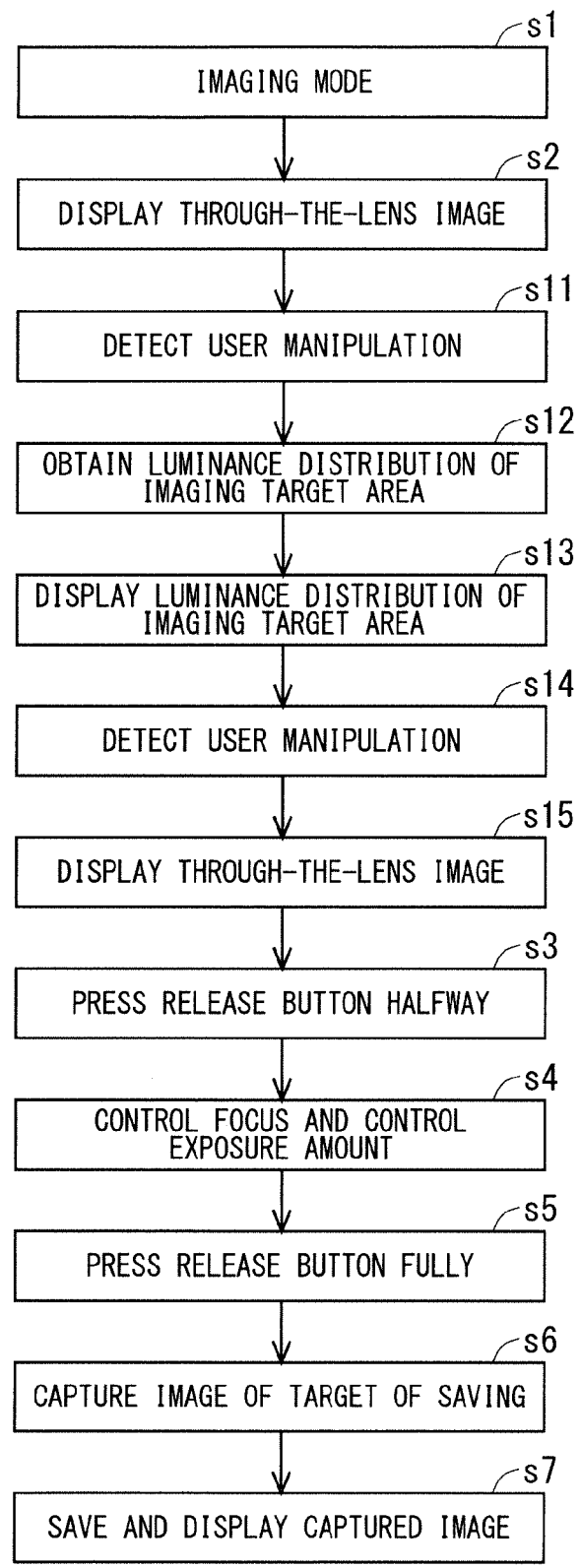
FIG. 11 illustrates a flowchart showing an operation of an imaging apparatus according to a modification.

FIG. 11 illustrates a flowchart showing an imaging operation of the imaging apparatus 1 according to one modification during the use of the sixth exposure amount control mode. As illustrated in FIG. 11, with the through-the-lens image appearing in the display area 100 through the execution of Steps s1 and s2 described above, in Step s11, the manipulation detecting module 8 detects a predetermined user manipulation, for example, tapping for the display area 100. Then, Step s12 is executed.

In Step s12, as in the fourth and fifth exposure amount control modes, the metering processing module 600 divides an imaging target area into a plurality of blocks and obtains the luminance of each of the plurality of blocks. This allows the metering processing module 600 to obtain the luminance distribution of the imaging target area. The metering processing module 600 functions as a luminance distribution acquiring module that obtains the luminance distribution of an imaging target area.

Figure 12:
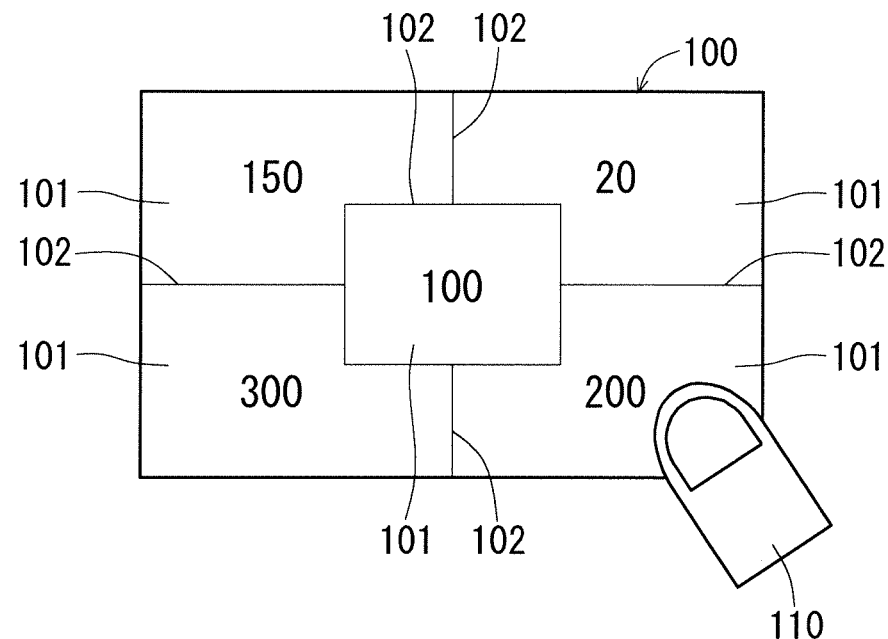
FIG. 12 illustrates a display example of a luminance distribution of an imaging target area.

After the execution of Step s12, in Step s13, the controller 6 causes the display 7 to display the luminance distribution of the imaging target area obtained in the metering processing module 600. The display area 100 of the display 7 accordingly displays the luminance distribution of the imaging target area indicating the luminance of each of the plurality of blocks of the imaging target area. FIG. 12 illustrates a display example of the luminance distribution of the imaging target area. FIG. 12 illustrates the luminance distribution of the imaging target area when the imaging target area is divided into five blocks 210 as in FIG. 6.

When displaying the luminance distribution of the imaging target area in the display area 100 under the control of the controller 6, as illustrated in FIG. 12, the display 7 divides the display area 100 into a plurality of partial areas 101 as in the division of an imaging target area into a plurality of blocks 210 by the metering processing module 600 (see FIG. 6). The display 7 then displays, in each of the plurality of partial areas 101, the luminance in a block 210 corresponding to the partial area 101. The example of FIG. 12 also illustrates boundary lines 102 indicating boundaries between the plurality of partial areas 101, together with the luminances of the plurality of blocks 210 of an imaging target area.

In the example of FIG. 12, an upper-left partial area 101 shows a value "150" of the luminance in an upper left block 210 corresponding to the upper-left partial area 101. An upper-right partial area 101 shows a value "20" of the luminance in an upper right block 210 corresponding to the upper-right partial area 101. A lower-left partial area 101 shows a value "300" of the luminance in a lower left block 210 corresponding to the lower-left partial area 101. A lower-right partial area 101 shows a value "200" of the luminance in a lower right block 210 corresponding to the lower-right partial area 101. A central partial area 101 shows a value "100" of the luminance in a central block 210 corresponding to the central partial area 101. It suffices that for the luminances shown in a plurality of partial areas 101, the relative relationship of the luminances is understood. Thus, the luminance may be expressed in any unit.

In Step s14, with the luminance distribution of an imaging target area appearing in the display area 100, the manipulation detecting module 8 detects a user manipulation of designating a use area to be used in controlling an exposure amount in an imaging target area. Then, in controlling an exposure amount (Step s4), the exposure amount controller 15 uses the luminance in the use area designated through the user manipulation in the imaging target area. When the manipulation detecting module 8 detects the user manipulation of designating a use area to be used in controlling an exposure amount in the imaging target area, in Step s15, the display 7 displays a through-the-lens image in the display area 100 again under the control of the controller 6.

In one modification, the user can, for example, tap the display area 100 with the finger 110 or the like to designate a use area to be used in controlling an exposure amount in an imaging target area. In one modification, when the touch panel 80 of the manipulation detecting module 8 detects tapping for any one of a plurality of partial areas 101 constituting the display area 100, the block 210 of the imaging target area corresponding to the tapped partial area 101 is set as a use area, and the exposure amount controller 15 uses the luminance of the use area. For example, as illustrated in FIG. 12, when the touch panel 80 detects tapping for the lower-right partial area 101 of the display area 100 with the finger 110 or the like, the lower right block 210 of the imaging target area corresponding to the lower-right partial area 101 is set as a use area, and the exposure amount controller 15 uses the luminance (in the example of FIG. 12, "200") of the lower right block 210.

As described above, the manipulation for a partial area 101 included in the display area 100 is a user manipulation of designating the partial area 101 as a use area to be used in controlling an exposure amount.

When Step s3 is executed after Step s15 and the manipulation detecting module 8 detects that the release button has been pressed halfway, in Step s4, the controller 6 controls the focus and exposure amount of the imaging module 2. In this case, the exposure amount controller 15 of the controller 6 controls an exposure amount on the basis of the luminance in the use area designated through the user manipulation detected in Step s14. Consequently, an exposure amount is controlled on the basis of the luminance in the area of the imaging target area, which has been designated by the user. Thus, the imaging apparatus 1 according to one modification images the portion of the imaging target area, designated by the user, at an appropriate brightness.

After Step s4, Steps s5, s6, and s7 are executed sequentially as described above, so that a captured image (more accurately, an image signal indicative of the captured image) of a target of saving is stored in the storage 61, and that the captured image appears in the display area 100.

As described above, with the luminance distribution of an imaging target area appearing in the display area 100, the manipulation detecting module 8 detects a user manipulation of designating a use area to be used in controlling an exposure amount in the imaging target area. This allows the user to designate a use area to be used in controlling an exposure amount in an imaging target area, that is, an area serving as a reference in controlling an exposure amount, with reference to the luminance distribution of the imaging target area. The user can accordingly designate an area serving as a reference in controlling an exposure amount while contemplating what captured image will be obtained in the imaging apparatus 1 from the luminance distribution of an imaging target area. Consequently, the imaging apparatus 1 can more easily obtain a captured image meeting user's preference.

In the fourth exposure amount control mode, the minimum luminance area of an imaging target area is used as a reference in controlling an exposure amount. Thus, when the fourth exposure amount control mode is used to control an exposure amount, an overexposure occurs. This results in a whitish image in an area with relatively high luminance in the imaging target area, increasing a risk of blown out highlights in a captured image. In contrast, in the sixth exposure amount control mode, the user can designate a use area to be used in controlling an exposure amount in an imaging target area with reference to the luminance distribution of the imaging target area, and thus, can designate an area with not-too-low luminance in the imaging target area as a use area. Therefore, blown out highlights can be prevented or reduced in a captured image.

In the fifth exposure amount control mode, the maximum luminance area of an imaging target area is used as a reference in controlling an exposure amount. Thus, when the fifth exposure amount control mode is used to control an exposure amount, an underexposure occurs. This results in a darkened image in an area with relatively low luminance in the imaging target area, increasing a risk of blocked up shadows in a captured image. In contrast, in the sixth exposure amount control mode, the user can designate a use area to be used in controlling an exposure amount in an imaging target area with reference to the luminance distribution of the imaging target area, and thus, can designate an area with not-too-high luminance in the imaging target area as a use area. Therefore, blocked up shadows can be prevented or reduced in a captured image.

In the example above, the display 7 divides the display area 100 into a plurality of partial areas 101 as in the case where the metering processing module 600 divides an imaging target area into a plurality of blocks 210, and displays, in each of the plurality of partial areas 101, the luminance in a block 210 corresponding to the partial area 101. Then, when the manipulation detecting module 8 detects a manipulation for any one of a plurality of partial areas 101 constituting the display area 100, the exposure amount controller 15 sets a block 210 of an imaging target area corresponding to the manipulated partial area 101 as a use area. Thus, the user can intuitively recognize the luminance of a to-be-designated use area more easily when manipulating the display area 100 to designate a use area in controlling an exposure amount. This improves the manipulation performance of the imaging apparatus 1.

Figure 13:
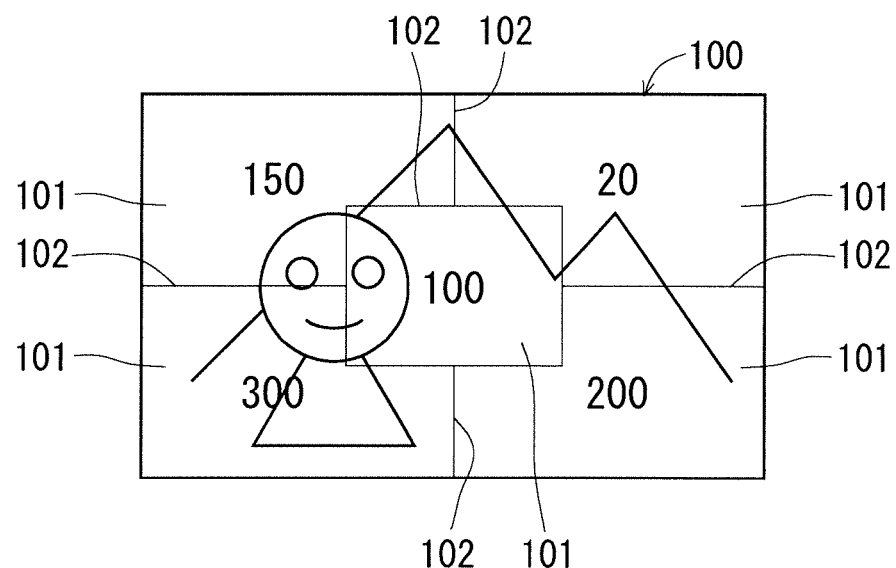
FIG. 13 illustrates how a luminance distribution of an imaging target area and an image of the imaging target area appear while overlapping each other.

The luminance distribution of an imaging target area may appear while overlapping a through-the-lens image in the display area 100. FIG. 13 illustrates an example of how the luminance distribution of an imaging target area appears while overlapping a through-the-lens image in the display area 100. In the example of FIG. 13, in each partial area 101 of the display area 100, an image and the luminance of a block 210 of an imaging target area corresponding to the partial area 101 appear.

As illustrated in FIG. 13, displaying an image of an imaging target area and the luminance distribution of the imaging target area in an overlapping manner allows the user to more easily contemplate what captured image will be obtained in the imaging apparatus 1 from the luminance distribution of the imaging target area. This allows the imaging apparatus 1 to more easily obtain a captured image meeting user's preference.

Although the imaging apparatus 1 according to one modification has first to sixth exposure amount control modes, it may not have at least one of the first to fifth exposure amount control modes.

While the imaging apparatus 1 has been shown and described in detail, the foregoing description is in all aspects illustrative and not restrictive. Also, the variations are applicable in combination as long as they are consistent with each other. It is therefore understood that numerous modifications and variations can be devised without departing from the scope of the present disclosure.

The invention claimed is:

1. An imaging apparatus, comprising:
   a camera configured to capture an image; and
   a controller configured to divide an imaging target area of an image captured by the camera into a plurality of blocks based on one division method selected from a plurality of types of division methods determined in the imaging apparatus, and obtain luminances of the plurality of blocks to control an exposure amount in the camera on the basis of the obtained luminances,
   wherein the imaging apparatus includes
      a first exposure amount control mode in which the controller controls the exposure amount based on a luminance of a minimum luminance block among the plurality of blocks, and
      a second exposure amount control mode in which the controller controls the exposure amount based on a luminance of a maximum luminance block among the plurality of blocks, and
   wherein the imaging apparatus detects a first user manipulation of designating a mode used by the imaging apparatus from amongst the first and second exposure amount control modes.

2. The imaging apparatus according to claim 1, wherein the imaging apparatus detects a user manipulation of designating the one division method used by the controller among the plurality of types of division methods.

3. The imaging apparatus according to claim 1, wherein the controller is configured to obtain a luminance distribution of the imaging target area,
   the image apparatus further comprises a display configured to display the luminance distribution in a display area, and
   the imaging apparatus detects a third user manipulation of designating a use area used in control of the exposure amount in the imaging target area while the display displays the luminance distribution in the display area.

4. The imaging apparatus according to claim 3, wherein the imaging apparatus further includes a third exposure control mode in which the controller obtains the luminance distribution, the display displays the luminance distribution in the display area, and the controller controls the exposure amount on the basis of a luminance in the use area designated in the third user manipulation detected by the imaging apparatus while the display displays the luminance distribution in the display area, and the imaging apparatus detects the first user manipulation of designating the mode used by the imaging apparatus from amongst the first to third exposure amount control modes.

5. The imaging apparatus according to claim 3, wherein the controller divides the imaging target area into a plurality of blocks and obtains the luminance distribution indicative of luminances of the plurality of blocks, and a block included in the plurality of blocks is designated as the area in the third user manipulation.

6. The imaging apparatus according to claim 3, wherein when displaying the luminance distribution in the display area, the display divides the display area into a plurality of partial areas as in the same manner that the controller divides the imaging target area into the plurality of blocks, and displays, in each of the plurality of partial areas, a luminance in the block corresponding to the partial area, and the imaging apparatus detects the third user manipulation for the display area, and a block included in the plurality of blocks, which corresponds to a partial area manipulated in the third user manipulation among the plurality of partial areas, is designated as the use area.

7. A non-transitory storage medium readable by a computer configured to store a control program for controlling an operation of an imaging apparatus configured to capture an image, the storage medium storing the control program that causes the imaging apparatus to execute:

(a) dividing an imaging target area of the image into a plurality of blocks on the basis of one division method selected from a plurality of types of division methods determined in the imaging apparatus and obtaining luminances of the plurality of blocks;

(b) operating in a first exposure amount control mode of controlling an exposure amount in the imaging apparatus on the basis of a luminance of a minimum luminance block among the plurality of blocks;

(c) operating in a second exposure amount control mode of controlling the exposure amount on the basis of a luminance of a maximum luminance block among the plurality of blocks; and (d) detecting a first user manipulation of designating a mode used by the imaging apparatus from amongst the first and second exposure amount control modes, wherein the control program causes the imaging apparatus to execute the first exposure amount control mode when the mode designated in the detected first user manipulation is the first exposure amount control mode, and the control program causes the imaging apparatus to execute the second exposure amount control mode when the mode designated in the detected first user manipulation is the second exposure amount control mode.

8. An exposure amount control method in an imaging apparatus configured to capture an image, the method comprising:

(a) dividing an imaging target area of the image into a plurality of blocks on the basis of one division method selected from a plurality of types of division methods determined in the imaging apparatus and obtaining luminances of the plurality of blocks;

(b) operating in a first exposure amount control mode of controlling an exposure amount in the imaging apparatus on the basis of a luminance of a minimum luminance block among the plurality of blocks;

(c) operating in a second exposure amount control mode of controlling the exposure amount on the basis of a luminance of a maximum luminance block among the plurality of blocks; and (d) detecting a first user manipulation of designating a mode used by the imaging apparatus from amongst the first and second exposure amount control modes, wherein the first exposure amount control mode is executed when the mode designated in the detected first user manipulation is the first exposure amount control mode, and the second exposure amount control mode is executed when the mode designated in the detected first user manipulation is the second exposure amount control mode.

\* \* \* \* \*